W. O. C. FRITSCHLER.
Weighing Apparatus.
No. 36,290.   Patented Aug. 26, 1862.
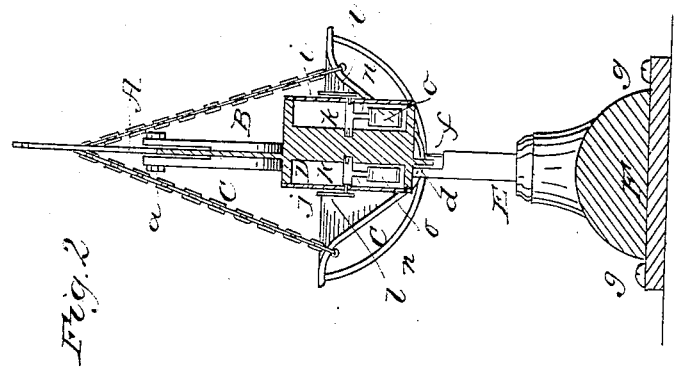
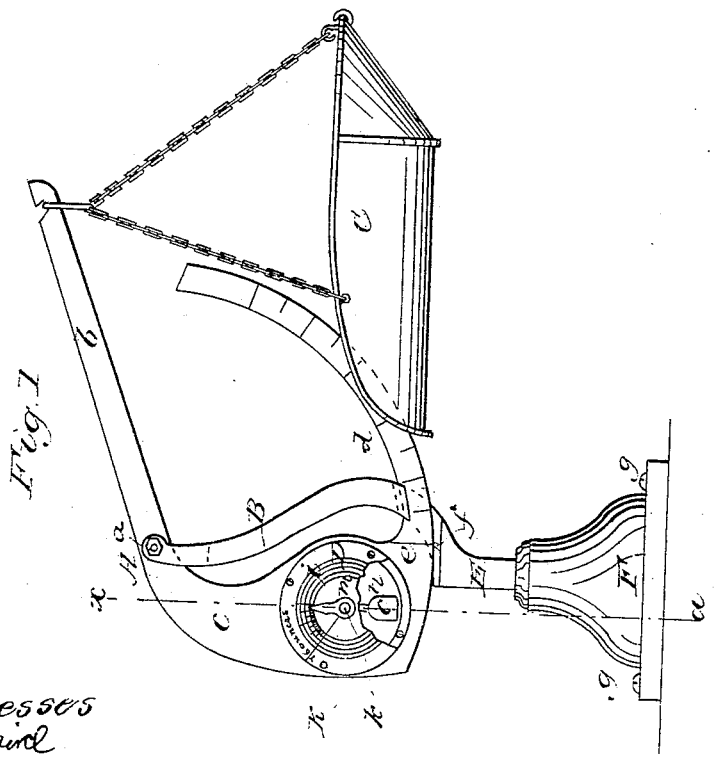

UNITED STATES PATENT OFFICE.

WILLIAM O. C. FRITSCHLER, OF BROOKLYN, NEW YORK.

IMPROVEMENT IN WEIGHING APPARATUS.

Specification forming part of Letters Patent No. 36,290, dated August 26, 1862.

*To all whom it may concern:*

Be it known that I, WILLIAM O. C. FRITSCH-LER, of Brooklyn, in the county of Kings and State of New York, have invented a new and Improved Weighing Apparatus; and I do hereby declare that the following is a full, clear, and exact description of the same, reference being had to the drawings forming a part of this specification, in which—

Figure 1 represents a face view of my invention. Fig. 2 is a transverse vertical section of the same, taken in the plane indicated by the line $x\ x$, Fig. 1.

Similar letters of reference in both views indicate corresponding parts.

The object of this invention is a weighing apparatus which will operate without weight or spring, and which will combine the advantages of the bent lever-balance and of the steelyard.

The invention consists in the employment or use of a bent lever fulcrated on a suitable pivot and arranged so that from its long light arm a scoop or other device to receive the article or articles to be weighed can be suspended, whereas its other arm turns down and forms an arc or portion of a circle described from the center of the fulcrum, so that a scale marked on said arc moves close behind a stationary index, said arm being provided with a weighted box, which contains one or two plumbing devices operating on indices placed on the outside of the covers of said weighted box for the purpose of controlling the correct operation of the apparatus, and so that the actual weight of the body to be weighed can be observed from either side of the bent lever with ease and convenience.

To enable those skilled in the art to make and use my invention, I will proceed to describe its construction and operation with reference to the drawings.

The bent lever A is fulcrated on a pivot, $a$, which has its bearings on the upper part of a standard, B. Said bent lever is provided with a long light arm, $b$, which extends from one side of the fulcrum, and from which the scoop C or any other device capable to receive or retain the articles to be weighed is suspended. The arm $c$ of the lever A, which extends from that side of the fulcrum opposite the arm $b$, turns down nearly at right angles with said arm $b$, and its lower extremity is curved up, so as to form an arc or portion of a circle, $d$, which is described from the fulcrum as the center. The arm $c$ is loaded with a box, D, of such a weight that the same is capable to balance the weight which may be suspended from the long arm $b$. If the scoop is empty or in a state of rest, the loaded arm $c$ sinks down to the position shown in Fig. 1 of the drawings, and a mark, $e$, on the inner end of the arc $d$ comes opposite an index, $f$, which is inserted into the pedestal E. From this pedestal the standard B, which bears the fulcrum-pin $a$, rises, and the lower part of the same is sufficiently heavy to prevent the apparatus tipping over. Said pedestal may be placed on a platform, F, with four (more or less) set-screws, $g$, which serve to adjust the whole apparatus in the proper position. The arc $d$ is provided with a scale produced by placing different weights in the scoop C and marking the points on said arc which are successively brought opposite the index $f$.

The box D, which forms the weight of the loaded arm $c$, is divided by a central partition, $h$, in two compartments, each of which is provided with a cover, $i\ j$, one on each side of the arm $c$. Each compartment of the box D contains a small arbor, $k$, which has its bearing on one end in the central partition, $h$, and on the other end in the cover $i$ or $j$, through which it extends far enough to afford room for an index, $l$, which is secured in the desired position by a nut, $m$, or in any other desirable manner.

From each of the arbors $k$ an arm, $n$, extends, which carries a small weight, $o$, and it is obvious that these weights will have a tendency to keep the arms $n$, to which they are attached, continually in a vertical position. It is obvious, therefore, that if the arbors $k$ turn freely in their bearings, and if the indices $l$ are firmly secured to said arbors, by moving the bent lever A round its fulcrum the surfaces of the covers $i\ j$ will continually change their position in regard to the indices $l$. If the bent lever is now moved by placing different weights into the scoop C, and if the different points on the surfaces of the covers which come successively opposite the indices are marked, two scales are obtained—one on each cover—which exactly correspond with each other, and which will also correspond with the scale on the arc $d$, if produced by using the same weights, or simultaneously with said scale. After the scales on the arc $d$ and on the surfaces of the covers are made, the weight of an article can be ascertained by placing the same in the scoop or fastening it to the arm $b$ and observing the position of either of the indices $f$ $l$, and the scales on the cover serve to control each other and that on the arc $d$.

This weighing apparatus is very simple in its construction and it can be made cheap. Its principal parts—viz., the bent lever and the pedestal with the standard—can each be cast out of one piece, and said parts can be connected with very little labor or loss of time. It is particularly intended to be used by housekeepers or in families; but it may be fitted up by making insignificant changes, so that it can be used for all purposes where a balance may be required.

Having thus fully described my invention, what I claim as new, and desire to secure by Letters Patent, is—

The arrangement of the weighted box D, containing the plumbing devices $k$ $o$ $l$, in combination with scales marked on the covers $i$ $j$ and on the arc $d$, and with the bent lever A, all constructed and operating substantially as shown and described.

WM. O. C. FRITSCHLER.

Witnesses:
JAMES LAIRD,
TIMOTHY SHIVE.